United States Patent [19]
Sarkissian

[11] 4,246,948
[45] * Jan. 27, 1981

[54] PNEUMATIC TIRE HAVING A PNEUMATIC SAFETY INSERT WITH BEADS

[75] Inventor: Berge Sarkissian, Southington, Conn.

[73] Assignee: Uniroyal, Inc., New York, N.Y.

[ * ] Notice: The portion of the term of this patent subsequent to May 8, 1996, has been disclaimed.

[21] Appl. No.: 48,571

[22] Filed: Jun. 14, 1979

[51] Int. Cl.³ .................. B60C 5/06; B60C 17/00
[52] U.S. Cl. .................. 152/340; 152/330 RF; 152/362 R; 152/379.5
[58] Field of Search .................. 152/330 RF, 339, 340, 152/342, 331, 362 R, 379 R, 379.5, 379.3, 381.3, 400, 401

[56] References Cited
U.S. PATENT DOCUMENTS

| | | | |
|---|---|---|---|
| 2,713,372 | 7/1955 | Danow | 152/342 |
| 2,754,876 | 7/1956 | King | 152/341 |
| 2,884,983 | 5/1959 | Cuesta | 152/363 |
| 3,025,902 | 3/1962 | Sanderson | 152/340 |
| 3,034,557 | 5/1962 | Beckadolph | |
| 3,254,692 | 6/1966 | Travers | 152/340 |
| 3,487,870 | 1/1970 | Huber | 152/340 |
| 3,612,139 | 10/1971 | Marzocchi | 152/362 |
| 3,885,614 | 5/1975 | Fujikawa et al. | 152/340 |
| 4,153,095 | 5/1979 | Sarkissian | 152/340 |

FOREIGN PATENT DOCUMENTS 808481 2/1959 United Kingdom .

*Primary Examiner*—Michael W. Ball
*Attorney, Agent, or Firm*—Philip Rodman

[57] ABSTRACT

A pneumatic insert for a pneumatic tire comprises a generally toroidal-shaped hollow member having a pair of annular insert beads with sidewalls extending therefrom joined to an insert crown portion. Each insert bead has a foot portion with a projecting elastomeric formation at the bead heel to furnish an inner bead diameter at the heel that is less than the inner bead diameter at the toe.

In at least one embodiment of the invention the bead heel projection is of triangular shape with a vertex of the triangle defining the first inner bead diameter.

In another embodiment of the invention the projecting elastomeric formation extends axially away from the bead heel in a direction substantially parallel to the bead foot.

22 Claims, 15 Drawing Figures

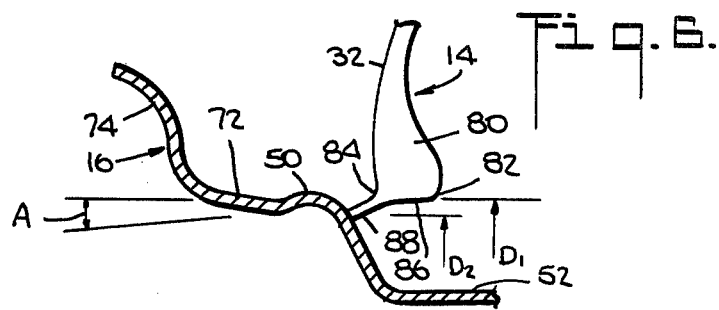
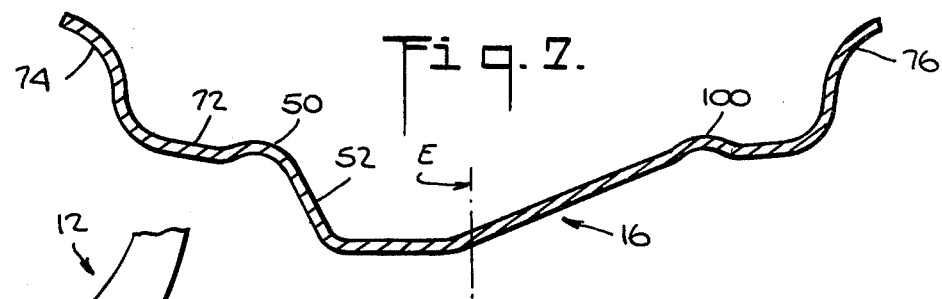
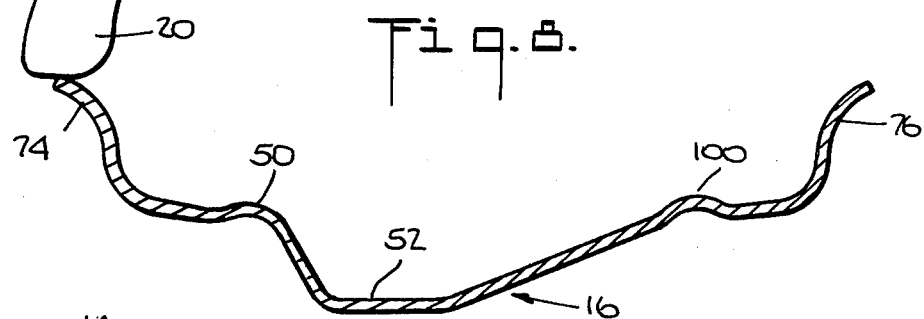
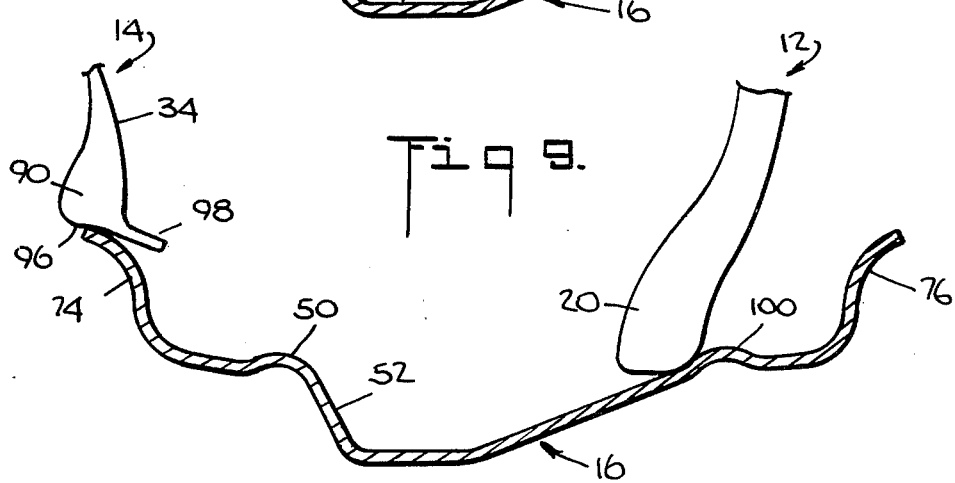

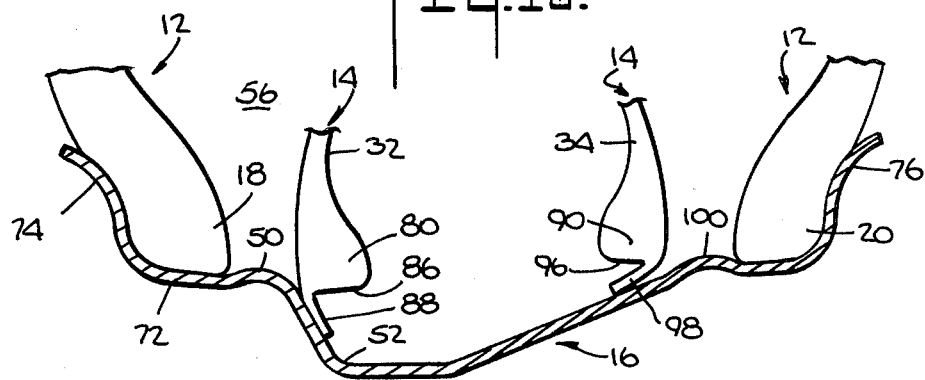
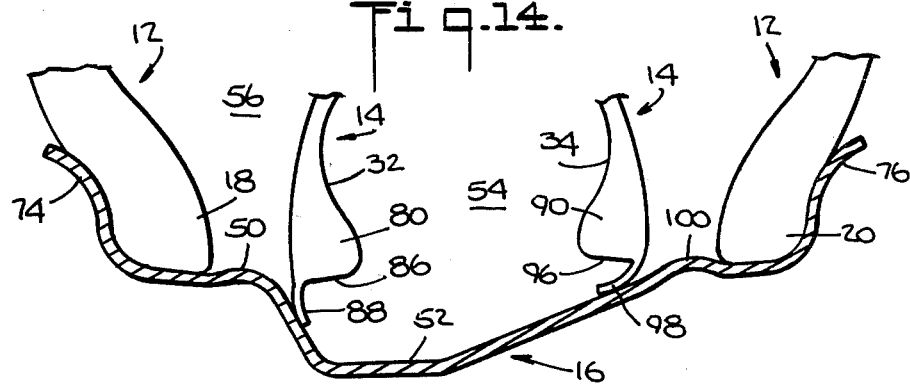
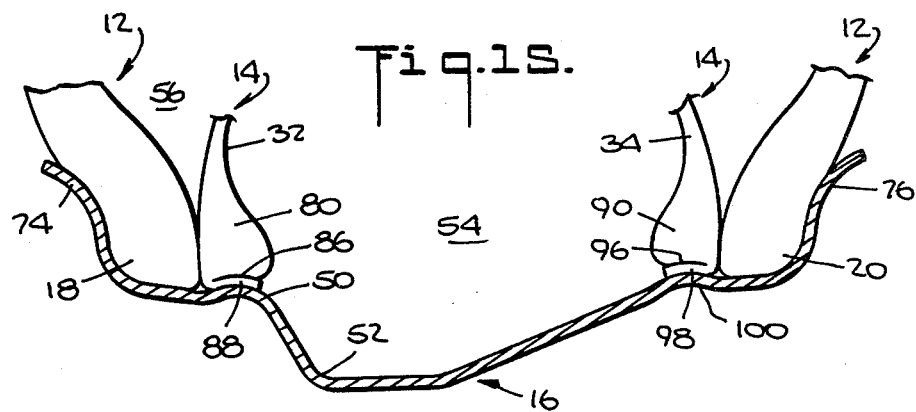

PNEUMATIC TIRE HAVING A PNEUMATIC SAFETY INSERT WITH BEADS

This invention is directed to pneumatic tires with run-flat capabilities and more particularly to a pneumatic tire having a pneumatic safety insert with beads that maintain a substantially leak-tight seal on a wheel rim in an uninflated as well as an inflated condition of the insert.

It is well known that run-flat inserts such as disclosed in my U.S. Pat. No. 4,153,095 permit a deflated tire to remain in operation at limited speeds for a limited distance to avoid the immediate inconvenience and hazards that are normally associated with abrupt and unexpected tire deflations as well as tire deflations of a less sudden nature.

In a typical run-flat situation air pressure is lost from the tire pressure chamber but remains at an operational pressure level in the insert pressure chamber for a time duration that is partly based on the type of tire failure that has occurred, the road conditions and vehicle speed. Preferably the insert pressure chamber and the tire pressure chamber are non-communicable with the insert beads maintaining a leak-tight seal on the wheel rim during run-flat operation.

It is also desirable that the insert beads of an uninflated insert provide a leak-tight seal to facilitate insert inflation. When such an insert is mounted onto a wheel rim the beads can develop an out-of-round or slightly elliptical condition due to temporary bead distortion as the insert is pushed over the wheel rim flanges. During mounting, the insert beads can also develop a kink which causes a localized spacing between the insert beads and the wheel rim. If an out-of-round or kink condition occurs any air that is introduced into the insert during insert inflation can escape into the tire pressure chamber and the insert will not seat properly against the tire rim. Under these circumstances independent inflation of the insert is exceedingly difficult.

To accomplish a leak tight seal at the insert beads U.S. Pat. No. 3,254,692 and British Pat. No. 808,481 disclose a split rim wherein the insert beads are seated against opposite sidewalls of the wheel well. The support base for the insert beads is thus relatively narrower and less stable than it would be if the insert beads were spaced apart a greater distance than the wheel well width. U.S. Pat. No. 2,822,015 requires use of a bead engaging U-shaped support member or connecting web disposed in the wheel well of a rim to seal against the beads of a run flat insert. U.S. Pat. No. 2,754,876 shows elongated rubber flaps depending from the interior side of the insert beads to bear against the wheel well of the rim. These structures are relatively complex and/or lead to burdensome mounting procedures.

It is thus desirable to provide a run-flat insert with beads that furnish a substantially lead-tight seal with a wheel rim in an uninflated condition and does not require use of split rims, bead engaging support members or wheel well flaps.

Among the several objects of the invention may be noted the provision of a novel safety tire incorporating a pneumatic insert with beads, a novel safety tire and rim assembly that incorporates a standard tire and a standard rim, a novel safety tire and rim assembly that includes separate non-communicable inflation chambers for the tire and insert, a novel pneumatic insert for a safety tire that substantially seals against a tire rim before inflation takes place and a novel safety tire and rim assembly wherein a substantially leak-tight seal between a tire inflation chamber and an insert inflation chamber is obtainable in an uninflated condition of the insert by providing a bead heel extension at the insert beads.

Other objects and features will be in part apparent and in part pointed out hereinafter.

The present invention relates to a novel safety tire incorporating a standard pneumatic tire and a separate pneumatic insert. The pneumatic insert is formed as a generally toroidal-shaped hollow member having a pair of axially spaced apart insert beads. The insert is mounted on a standard rim for positioning within the tire cavity with the insert beads seated on the rim flange humb adjacent the tire beads.

Each insert bead has a foot portion that in one embodiment of the invention, includes a projecting elastomeric formation at the bead heel that is of triangular shape. The tip of this formation or bead extension is normally of a smaller diameter than the bead toe and the rim flange hump. Thus if the insert bead is slightly out-of-round or has a kink at some point on the bead periphery, the projecting triangular formation at the bead heel reaches the rim to provide the necessary seal. As the rubber at the insert bead is squeezed upon seating it will fill any gap at the rim in the area of the insert bead toe because of conservation of volume. Inflation of the tire and insert is accomplished in any suitable known manner such as described in my previously referred to U.S. patent. A tire inflation chamber defined between the tire and the pneumatic insert is thus noncommunicable with the insert inflation chamber.

In another embodiment of the invention a projecting formation at the bead heel has sufficient elongation to fold between the bead foot and the wheel rim during mounting.

In a further embodiment of the invention the projecting formation on an unmounted insert extends axially away from the bead heel, in a direction substantially parallel to the bead foot. This arrangement greatly facilitates mounting of the insert on the rim because the parallel projecting formation causes minimal interference with the wheel rim flange during mounting.

The invention accordingly comprises the constructions hereinafter described, the scope of the invention being indicated in the following claims.

In the accompanying drawings in which various possible embodiments of the invention are illustrated, FIG. 1 is a simplified sectional view showing a safety tire and rim assembly incorporating one embodiment of the present invention;

FIGS. 2, 4 and 5 are simplified fragmentary sectional views thereof prior to inflation on a wheel rim;

FIGS. 3 and 6 are simplified fragmentary sectional views of other embodiments of the invention prior to inflation on a wheel rim; and FIGS. 7–15 are simplified sectional views showing a mounting sequence.

Figure 1:
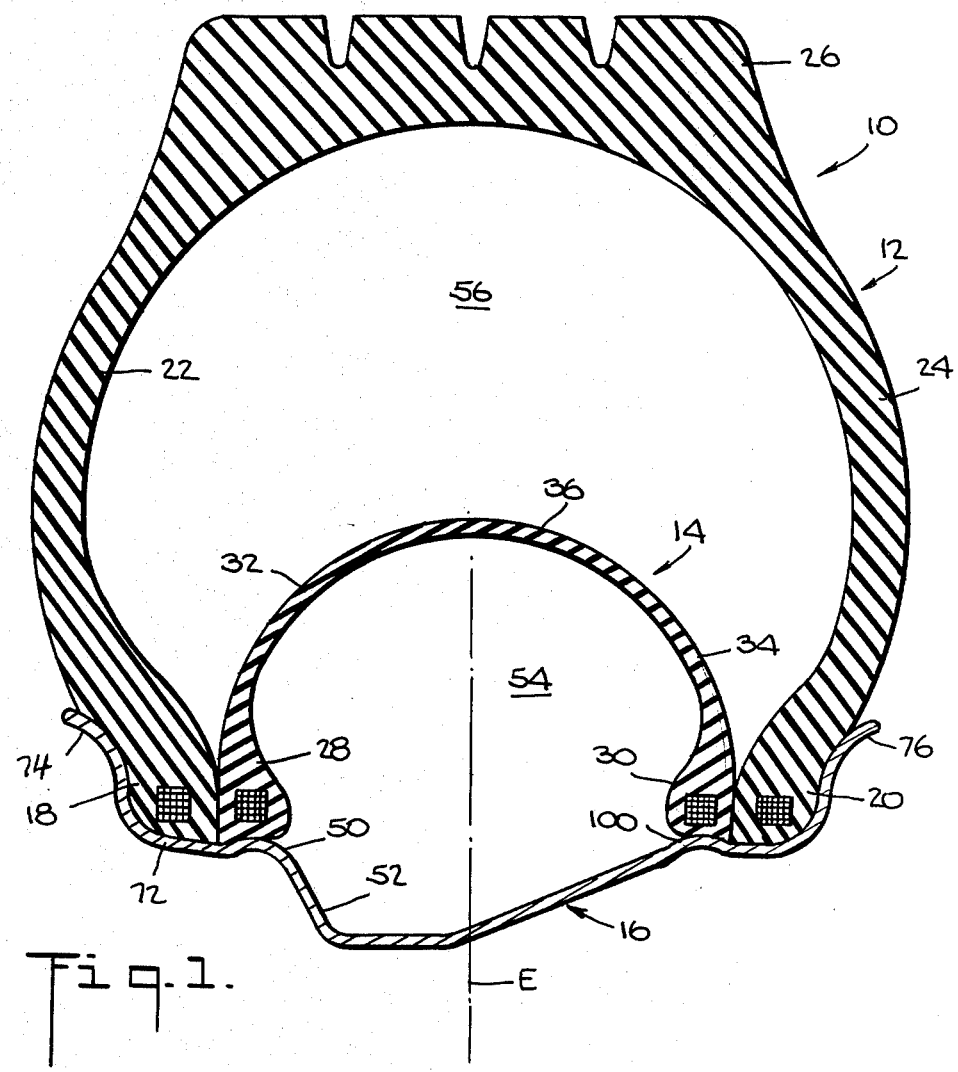

Referring to the drawings, a safety tire and rim assembly is generally indicated by the reference number 10 in FIG. 1. The assembly 10 comprises a standard tubeless pneumatic tire 12, with a pneumatic insert member 14 both mounted on a standard one piece drop-center rim 16.

The pneumatic tire 12 includes spaced annular bead portions 18 and 20 with sidewalls 22 and 24 extending therefrom and a tread portion 26 bridging the tire sidewalls.

The pneumatic insert member 14 is of generally toroidal shape with axially spaced annular insert beads 28 and 30, insert sidewalls 32 and 34, and an insert crown portion 36 the structural aspects of which are disclosed in detail in my U.S. Pat. No. 4,153,095.

Figures 2, 3:
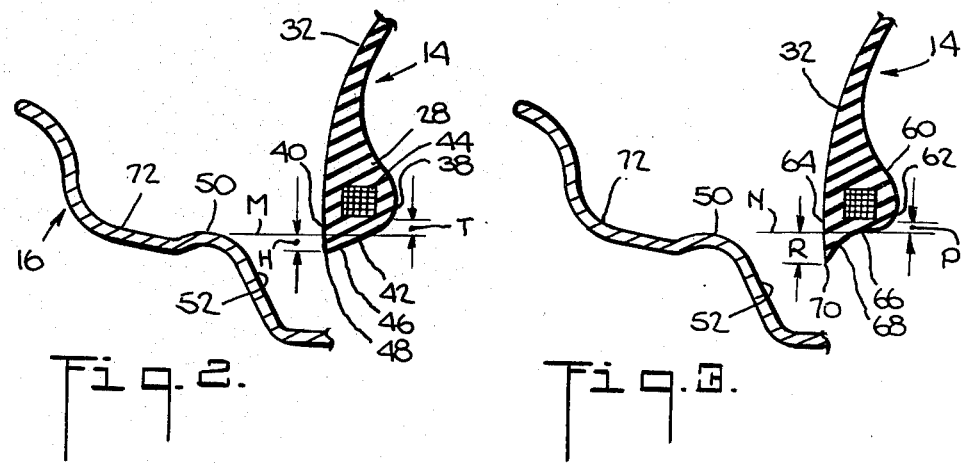

The insert bead 28, as shown in FIG. 2 comprises a toe portion 38 and a heel portion 40 which defines the extent of a foot portion 42. The foot portion 42 has a median section indicated by the intersection of the line M with the foot portion 42 generally midway between the toe portion 38 and the heel portion 40. A bead wire ring 44 is provided in the interior of the bead.

The foot portion 42, rather than being parallel to the rim or wheel axis (not shown), inclines from the toe 38 to the heel 40, that is from the inside surface of the bead 28 to the outside surface thereof to define a substantially triangular shape or form as indicated by the reference number 46. The triangular formation 46 has a vertex portion 48 projecting from the heel toward the wheel axis. Since the triangular formation 46 predominates at the heel portion 40 it can be considered as an extension of the heel portion or a projection thereof.

The vertex portion 48 which can be formed of a suitable elastomeric material such as rubber is normally of a smaller diameter than the rim flange hump 50 upon which the insert bead 28 is seated when mounting has been completed as shown in FIG. 1.

For an insert bead 28 that is approximately 0.4 inches wide from toe to heel it is feasible to provide an offset T of approximately 1/16th of an inch between the toe portion 38 and the median section M, and an offset H of approximately 1/16th of an inch between the vertex portion 48 and the median section M.

The insert bead 28 may develop an out-of-round condition or a kink due to distortion of the insert as it is disposed within the tire cavity prior to mounting on the rim 16. Similar distortions of the bead 28 can also occur during the mounting operation as the insert bead 28 is pushed over the rim flange.

If the insert bead 28 is slightly out-of-round or has a kink at some points around the bead circumference it will normally not touch the rim surface 52 between the rim flange humps 50 and 100 where the out-of-roundness or kink exists. Consequently any air introduced into the insert inflation chamber 54 can escape into the tire inflation chamber 56 and the insert will not seat properly on the rim. The vertex portion 48 helps overcome this problem by reaching the rim surface 52 to provide a necessary seal. The insert inflation chamber 54 can thus be sealed from the tire inflation chamber 56 even before insert inflation takes place.

Figure 4:
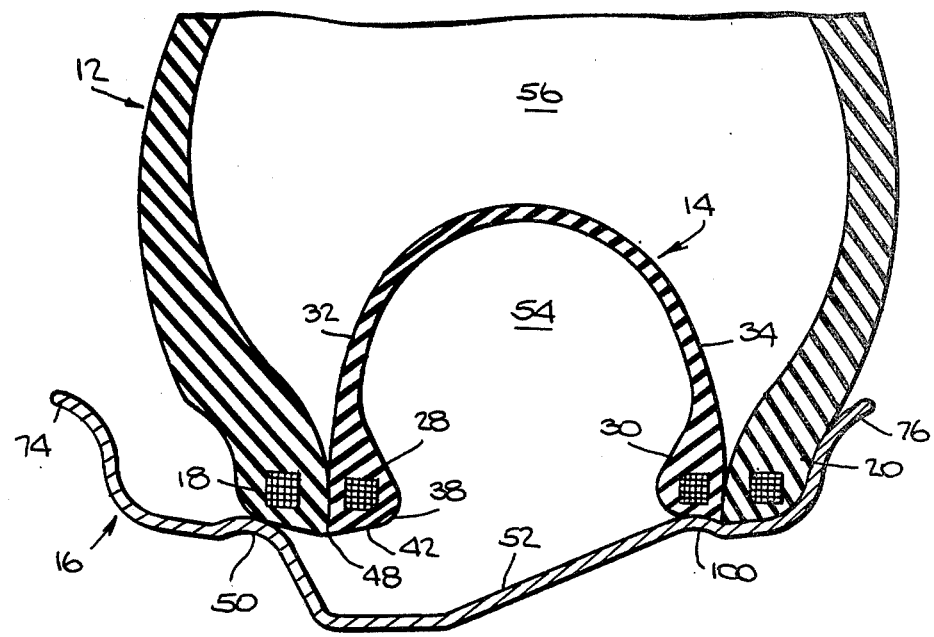
Figure 5:
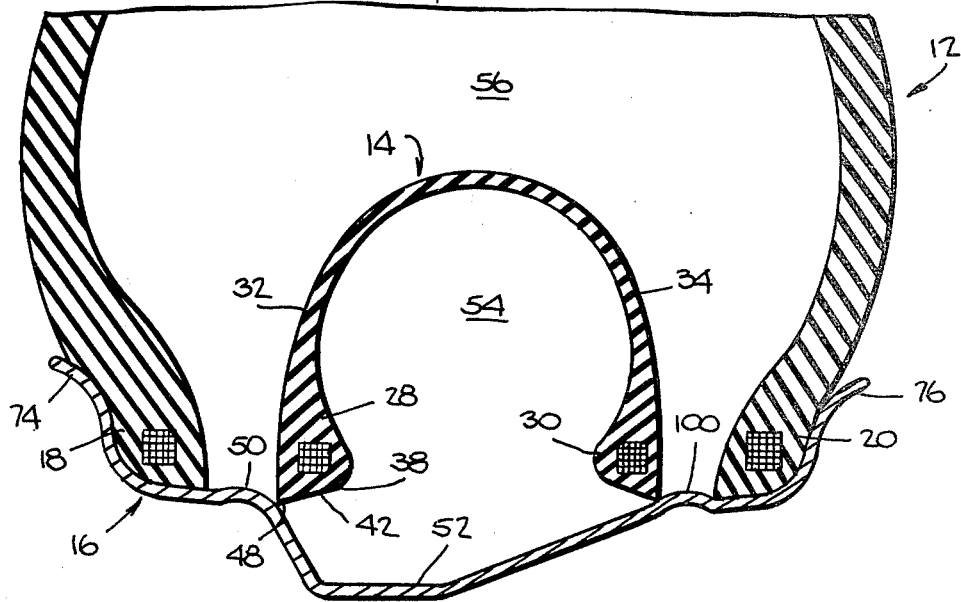
Figure 10:
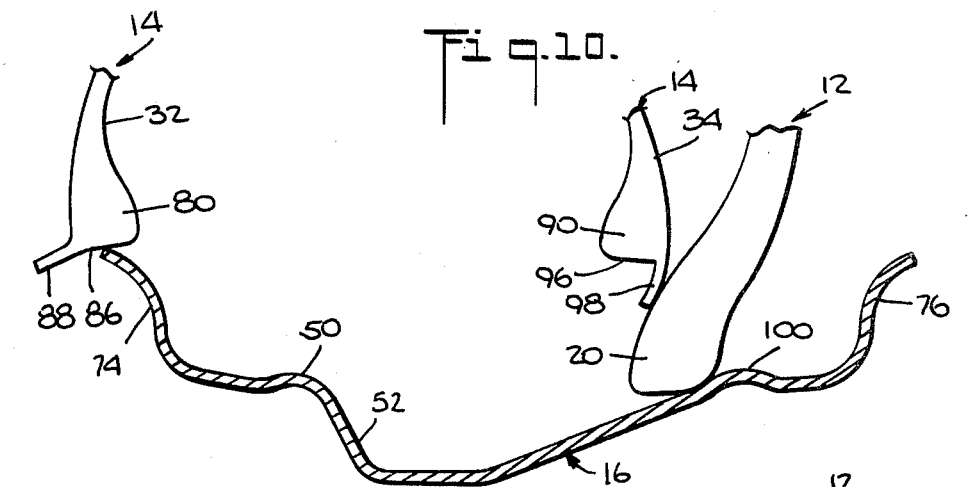
Figure 11:
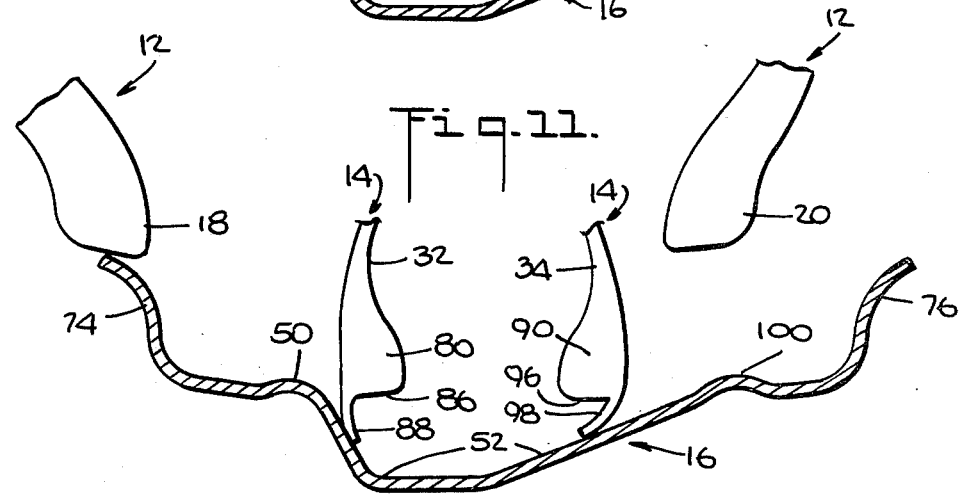

For example referring to FIG. 4 the insert 14 and the tire 12, after disposition on the rim 16 in a known manner, are ready for inflation. Any suitable known valve arrangement for separately pressurizing the insert inflation chamber 54 and the tire inflation chamber 56 can be used such as disclosed in my previously referred to U.S. patent. Normally any air introduced into the assembly 10 at this stage operates to inflate the tire 12. The tire 12 is thus inflated to seat the tire beads 18 and 20 thereby relieving the lateral compression imposed on the insert beads 28 and 30 by the tire beads 18 and 20. The tire 12 can then be deflated to provide further relief to the insert beads 28 and 30.

Preferably the insert 14 has an inherent rigidity or lateral stiffness that is sufficient to provide a given normal axial separation of the beads 28 and 30. The normal axial bead separation for a free, uninflated and unmounted insert is preferably greater than the axial distance between the rim flange humps 50 and 100. Thus when the insert 14 is constrained in an uninflated condition around the rim 16 the lateral stiffness of the insert provides a spring action which tends to spread the beads 28 and 30 toward the respective rim flange humps 50 and 100. The lateral stiffness of the insert 14 helps to assure contact between the insert beads 28, 30 and the rim surface 52.

In those instances where the insert bead 28 has developed an out-of-round and/or a kink condition the triangular formation 46 at the bead heel 40 for example, helps to provide a leak-tight seal between the insert bead 28 and the rim flange hump 50 around the bead circumference.

As air enters the insert inflation chamber 54 it is trapped therein and the pressure buildup forces the insert sidewalls 32 and 34 to spread enabling the vertex portion 48 for example to be squeezed between the rim flange hump 50 and the foot portion 42. Referring to FIGS. 1 and 2, as the rubber at the heel portion 40 is squeezed it will substantially fill the gap between the rim flange hump 50 and the foot portion 42 from the median section M to the toe portion 38. An effective seal between the insert beads 28 and 30 and the rim flange humps 50 and 100 is likewise assured in the inflated condition of the insert.

In another embodiment of my invention shown in FIG. 3 the insert 14 includes a bead 60. The bead 60 comprises a toe portion 62 and a heel portion 64 defining a foot portion 66 having a median section indicated by the intersection of the line N with the foot portion 66. A substantially triangular formation 68 projecting from the heel portion 64 toward the wheel axis includes a vertex portion 70 formed of elastomeric material such as rubber. For an insert bead of this type measuring approximately 0.4 inches from toe to heel it is feasible to have an offset P of approximately 1/16th of an inch between the toe portion 62 and the median section N, and an offset R of approximately ⅛th of an inch between the tip of the vertex portion 70 and the median section N.

The triangular formation 68 can provide the insert bead 60 with greater reach toward the rim support surface 52 than the vertex 48 of the bead 28. Moreover when the bead 60 is seated on the rim 16 the triangular formation 68 is not merely squeezed but folds between the foot portion 66 and the rim flange hump 50.

In a further embodiment of my invention as shown in FIG. 6 the insert 14 includes a bead 80. The bead 80 comprises a toe portion 82 and a heel portion 84 defining a foot portion 86 that is inclined from the toe portion 82 to the heel portion 84 such that the bead diameter $D_1$ at the toe 82 is of greater magnitude than the bead diameter $D_2$ at the heel 84. An elastomeric projection 88 formed at the heel portion 84 extends axially away from the heel portion a predetermined distance. The projection 88 normally extends in a direction substantially parallel to that of the foot portion 86 with an axial extent substantially equivalent to the axial distance between the toe portion 82 and the heel portion 84. The projection 88 has a thickness in a radial direction with respect to the wheel axis sufficient to enable said projection to maintain its normal axial posture yet permit folding of said projection between the foot portion 86 and the rim flange hump 50.

Preferably the inclination A of the foot portion 86 with respect to the wheel axis is approximately 5° to 20°. In the FIG. 3 embodiment the corresponding preferred inclination of the foot portion 66 from the median section N to the toe portion 62 is approximately 5° to 30°.

Prior to mounting, the insert 14 is disposed in the tire cavity and the rim 16 is usually supported with the equatorial plane E (FIG. 7) in a horizontal disposition. Referring to FIG. 8 the tire bead 20 is pushed over the rim flange 74 and drops toward the opposite rim flange 76. An insert bead 90, symmetrical to the insert bead 80 and associated with the insert sidewall 34 is pushed over the rim flange 74. The disposition of the insert bead 90 over the rim flange 74 is accomplished with relatively little rim flange interference due to the axial disposition of the heel projection 98 which corresponds to the heel projection 88 of the bead 80. The insert sidewall 34 drops toward the tire bead 20 and the downward movement of the projection 98 against the tire bead causes the projection 98 to fold toward the foot portion 96 which corresponds to the foot portion 86 of the bead 80.

Figure 12:
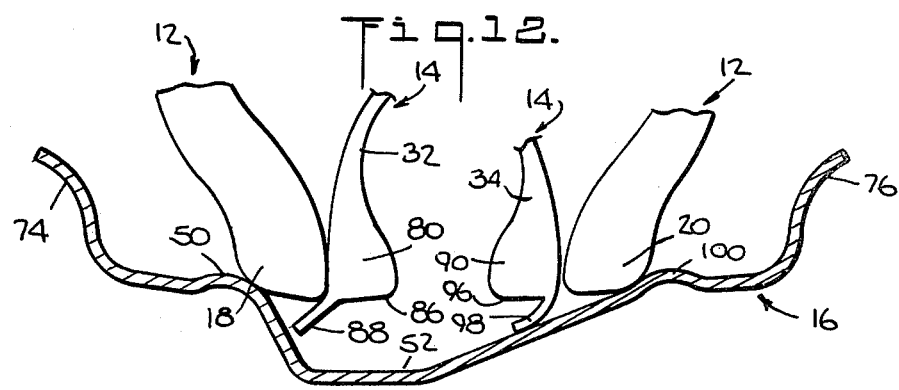

The insert bead 80 associated with the insert sidewall 32 is then pushed over the rim flange 74 also with relatively little rim flange interference due to the axial disposition of the projection 88. With both insert beads 80 and 90 disposed on the rim 16 the tire bead 18 is pushed over the rim flange 74 and has a tendency to force the insert bead 80 toward the insert bead 90 (FIG. 12). The tire 12 is inflated in a suitable known manner to seat the tire beads 18 and 20 (FIG. 13) and then deflated to permit the lateral stiffness of the insert 14 to spread the insert beads 80 and 90.

Even if a kink or out-of-round condition exists in the insert such as shown in a comparison of FIGS. 13 and 14 the projection 88 reaches the rim surface 52 (FIG. 14) to seal the insert inflation chamber 54. Air introduced into the insert inflation chamber 54 will cause further spreading of the beads 80 and 90 and a folding of the projections 88 and 98 between the respective foot portions 86, 96 and the respective rim flange humps 50 and 100.

As will be apparent to those skilled in the art the insert bead projections disclosed herein help assure the formation of a leak-tight insert inflation chamber prior to pressurization of the insert and help to stabilize the position of the insert beads on the rim during run-flat operation. The insert bead projections also help assure the maintenance of a reliable leak-tight seal under emergency run-flat conditions when such a seal is needed most.

Some advantages of the invention evident from the foregoing description include a pneumatic insert with beads that have a projection formed at the bead heel to facilitate provision of a pre-inflation leak-tight seal for the insert on the rim. A further advantage is that the bead heel projection compensates for temporary distortion or kinks of the insert bead that would otherwise permit the insert inflation chamber to communicate with the tire inflation chamber rendering independent pressurization of the insert nearly impossible.

One way of preventing bead distortion or kinks is to use bead wires that are resilient and regain their original shape after the distorting force is removed. Bead wires formed of steel or aramid fiber that are helically wound, as in a cable, furnish the bead with this desired shape restoring characteristic.

Beads composed of continuous or short lengths of steel, aramid or glass fibers oriented circumferentially with respect to the wheel axis and embedded in a rubber or a plastic medium such as polyester, polypropylene, high modulus polyurethane or thermoplastic also furnish this desirable shape restoring characteristic. The fiber content should be at least 30% to provide the necessary hoop strength. In general any material or construction that allows the bead to regain its round shape is desirable.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A pneumatic insert for a pneumatic tire in combination with a wheel rim having an axis of rotation and an axially extending annular support surface, said insert comprising a generally toroidal-shaped hollow insert member with a pair of axially spaced annular insert beads arranged to be supported on the axially extending annular support surface with said tire, said insert including a pair of insert sidewalls extending generally radially outwardly from the insert beads, and an insert crown portion joining the insert sidewalls, said insert having a predetermined lateral stiffness to provide a predetermined axial spacing of said insert beads, said insert beads comprising, in cross-section, an outer wall, an inner wall and a foot portion extending between said inner and outer walls, said foot portion including a heel portion adjacent to said outer wall and a toe portion adjacent to said inner wall, said foot portion including an elastomeric projection formed at said heel portion and having a first inner diametrical magnitude that is less than a second inner diametrical magnitude of the toe portion, to permit compression of said elastomeric projection against the axially extending annular support surface of said rim to ensure formation of a leak-tight seal between the insert beads and the support surface.

2. A pneumatic insert as claimed in claim 1 wherein said foot portion is inclined with respect to said annular support surface.

3. A pneumatic insert as claimed in claim 1 wherein said elastomeric projection is of triangular shape with a vertex of said triangle defining said first interior diametrical magnitude.

4. A pneumatic insert as claimed in claim 3 wherein said foot portion has a median section, said vertex extending away from said median section in a first direction a first predetermined amount and said toe portion extending away from median section in a second direction a second predetermined amount.

5. A pneumatic insert as claimed in claim 4 wherein said first and second predetermined amounts are equal.

6. A pneumatic insert as claimed in claim 4 wherein said first and second predetermined amounts are unequal.

7. A pneumatic insert as claimed in claim 6 wherein said first predetermined amount is approximately twice the magnitude of said second predetermined amount.

8. A pneumatic insert as claimed in claim 6 wherein said first and second predetermined amounts are selected to permit said projection to fold between the median section of said foot and said support surface when said insert is mounted on said rim and inflated to a predetermined pressure.

9. A pneumatic insert as claimed in claim 3 wherein said foot portion is inclined with respect to said wheel axis.

10. A pneumatic insert as claimed in claim 9 wherein the angle of inclination of said foot portion is in the range of approximately 5° to 30°.

11. A pneumatic insert as claimed in claim 1 wherein said projection extends away from said heel portion a predetermined distance in an axial direction, said projection having a predetermined thickness in a radial direction with respect to said axis of rotation to permit folding of said projection between said bead foot and said support surface when said insert is mounted on said rim and inflated to a predetermined pressure.

12. A pneumatic insert as claimed in claim 11 wherein said predetermined distance and the axial extent of said bead foot are of substantially equal magnitude.

13. A pneumatic insert as claimed in claim 11 wherein said foot portion is inclined with respect to said wheel axis from said toe portion to said heel portion.

14. A pneumatic insert as claimed in claim 13 wherein the angle of inclination of said foot portion is in the range of approximately 5° to 20°.

15. A pneumatic insert as claimed in claim 11 wherein said projection normally extends in a direction substantially parallel to said bead foot.

16. A pneumatic insert as claimed in claim 1 wherein said bead includes a bead ring formed of helically wound fiber.

17. A pneumatic insert as claimed in claim 16 wherein said fiber is selected from the group consisting of steel and aramid.

18. A pneumatic insert as claimed in claim 1 wherein said bead includes a bead ring comprised of predetermined lengths of fiber embedded in a plastic medium, said fibers being oriented circumferentially with respect to the wheel axis.

19. A pneumatic insert as claimed in claim 18 wherein said fiber is selected from the group consisting of steel, aramid and glass.

20. A pneumatic insert as claimed in claim 18 wherein said fiber is of relatively short length with respect to the circumference of said bead.

21. A pneumatic insert as claimed in claim 18 wherein said fiber is continuous around the circumference of said bead.

22. A pneumatic insert as claimed in claim 18 wherein said plastic medium is selected from the group consisting of polyester, polypropylene, high modulus polyurethane and thermoplastic.

* * * * *